Dec. 15, 1970         C. H. WEBER         3,546,875
ARTICULATED SUPPORT FOR A MOVABLE FLEXIBLE SUPPLY CONDUIT
Filed July 11, 1968                    2 Sheets-Sheet 2
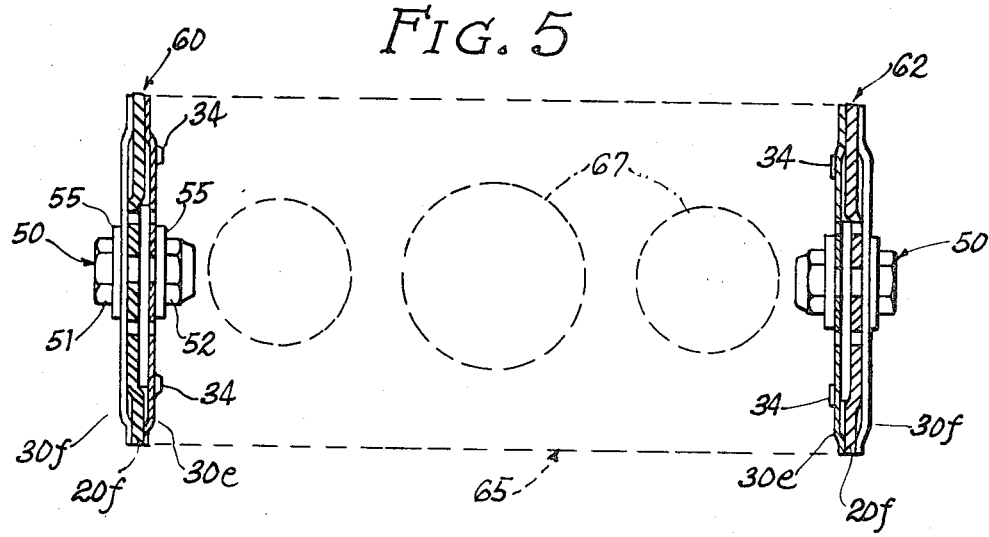
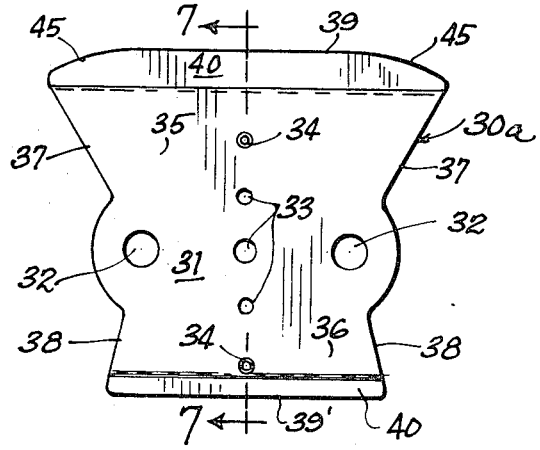
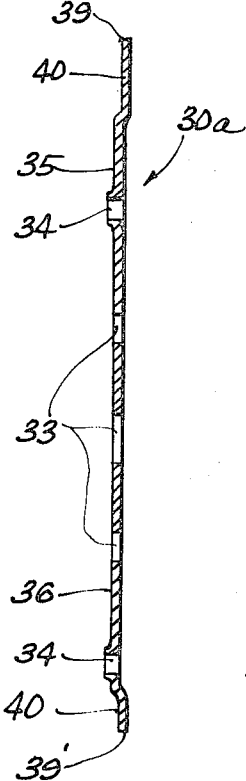
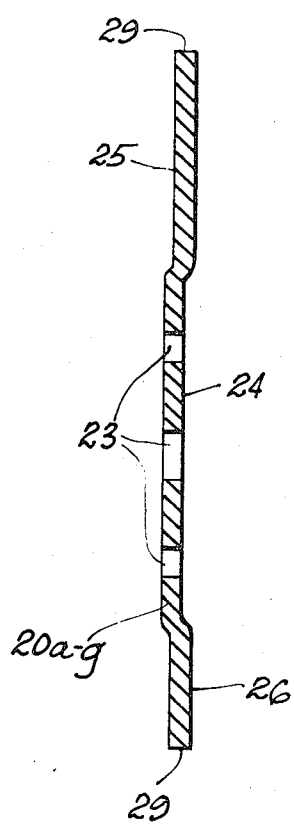
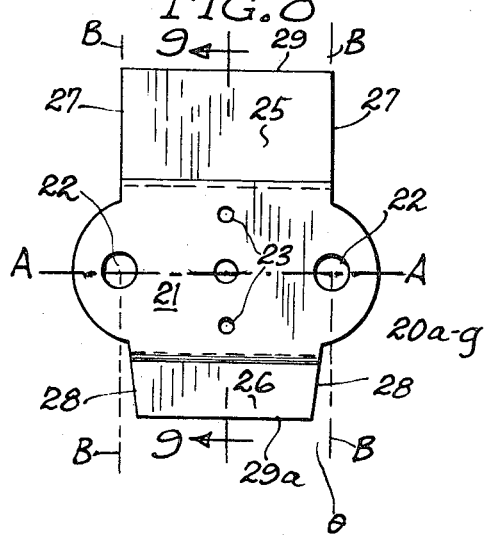

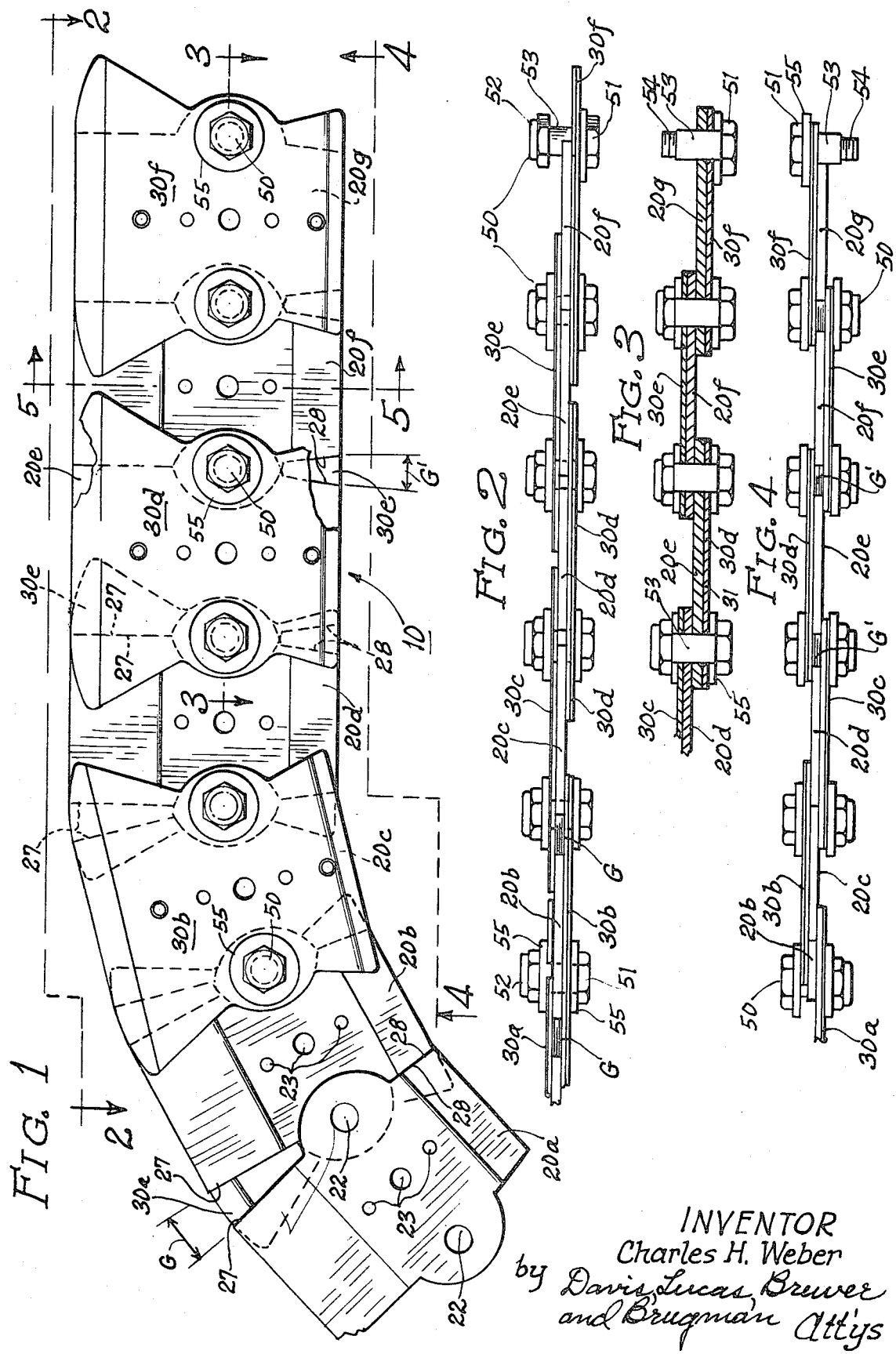

ARTICULATED SUPPORT FOR A MOVABLE
FLEXIBLE SUPPLY CONDUIT

Charles H. Weber, Mayville, Wis., assignor to Maysteel Products Corp., Milwaukee, Wis., a corporation of Wisconsin
Filed July 11, 1968, Ser. No. 744,155
Int. Cl. F16g 13/18
U.S. Cl. 59—78.1  7 Claims

ABSTRACT OF THE DISCLOSURE

An articulated support of alternately overlying unitary links, each of a single sheet having a pivot portion and planar support portions raised therefrom for abutment of adjacent links and a guard member, fastened on each link opposite the pivot portion thereon, to provide tie-bar reinforcement and guard portions overlapping support portions of adjacent link members.

BACKGROUND OF THE INVENTION

This invention relates generally to articulated supports for movable and flexible supply conduits, and more particularly, to an economical link member configuration in combination with a guard and reinforcement member therefor.

Machines such as lathes, shapers, mills, etc., have movable elements thereon which are supplied with utilities such as electricity, gas, lubrication fluids, etc., through flexible conduits. While the conduits are relatively flexible, they can rupture if bent to extremes, and they are subject to wear from abrasion. Naturally, it is desirable that the flexing and bending of the conduits be limited to a minimum radius of bending, and also that the conduit will not be chafed by the means which support it. Such articulated supports are in existence, for example, those provided in accordance with my prior Pat. No. 3,330,105 issued on July 11, 1967.

While the above typified articulated supports have proven satisfactory, individual link members thereof demand expensive and difficult manufacturing techniques. That is, portions of the links are folded over in a hem to provide abutting edges between adjacent links. Separate tie-bars are provided in the prior art links for reinforcement, providing lateral stiffness. Since it is possible to pinch one's fingers between abutting edges of adjacent links in such prior structure, it is desirable to provide a safety guard. In the past, separate guard members were provided; however, such have not proven entirely satisfactory, being either too cumbersome, or inefficient. Additionally, it had been assumed that wear would occur on the abutting edges. To the contrary, research reveals that wear occurs instead in the pivot holes through which adjoining links are joined.

SUMMARY OF THE INVENTION

Therefore, to overcome the foregoing and other difficulties of the prior art, the general objective of this invention is to provide a new and improved articulated support for a movable and flexible conduit. To this end, the present invention features a new configuration of link member, together with a guard member, which provide all the features desired. The individual link members can be more easily and economically manufactured by eliminiation of the hemming step. That is, instead of folding portions of each link, planar support portions of each link are merely raised or offset from a centermost pivot portion of the link. This results, in a preferred form, in a link member having a pivot face depressed one-half the thickness of the link. A plurality of such link members, alternately overlapped pivot face to pivot face, thereby present abutting support edges between adjacent link members. Some of the support edges converge to allow limited articulation, which presents gaps between adjacent link members. Guard members on alternately opposite faces of the pivot portions provide diverging sides to overlap the gaps. By virtue of a guard member opposite the pivot face of each link member, both sides of each gap are protected to prevent accidental insertion therebetween. Additionally, each guard member has a tie-bar portion reinforcing the link members and also providing wear reinforcement for the pivot holes.

Thus, one of the immediate objects of this invention is to promote economy in the manufacture of link members for an articulated support.

It is also an object of this invention to provide reinforcement for and avoid excessive pivot hole wear of an articulated support.

Another object of this invention is to prevent accidental insertion between adjacent link members of an articulated support.

It is still another object to provide a durable and dependable articulated support which is economical to produce by utilizing a minimum of parts requiring a minimum of simple mass-production manufactuirng steps.

Yet another object is to provide an articulated support of consecutive overlapping link members combined with guard members for safety and rigidity.

Further and other objects, and a more complete understanding of the invention may be had by referring to the following description and claims, taken in conjunction with the accompanying drawings.

Shown in the drawings is a form which is presently preferred, it being understood, however, that this invention is not necessarily limited to the precise arrangements and instrumentalities there shown.

In the drawings:

FIG. 1 is a side view of a portion of an articulated support of the invention;

FIG. 2 is an edge view in the directions of arrows 2—2 of FIG. 1;

FIG. 3 is a cross-section taken along line 3—3 of FIG. 1;

FIG. 4 is an edge view taken from the direction of arrows 4—4 of FIG. 1;

FIG. 5 is a cross-section across the articulated support of FIG. 1 in the direction of the arrows 5—5;

FIG. 6 is a side view of an individual guard member;

FIG. 7 is an enlarged cross-section of the guard member in FIG. 6;

FIG. 8 is a side view of a link member;

FIG. 9 is an enlarged cross-section of the link member of FIG. 8.

DESCRIPTION OF THE PREFERRED EMBODIMENTS

Referring now to the drawings in detail, wherein like numerals indicate like elements, there is shown in FIG. 1, an illustration of the articulated support of the present invention designated generally at 10. The articulated support 10 consists of a plurality of link members 20a–g. As may be seen best with reference to the cross-section of FIG. 3, the link members 20a–g are alternately overlying. That is, for example, link members 20d and 20f overlie the link members 20e and 20g.

The configuration of each individual link member 20a–g may be seen best with reference to FIGS. 8 and 9. Each link member 20a–g includes a flat pivot portion 21 with pivot openings 22 spaced apart on a longitudinal axis A—A. The pivot portion 21 has a typical link shape, being somewhat elongated and having rounded opposite ends, as shown. Openings 23, spaced along a vertical axis are provided for attachments described hereinafter. Since the link members 20a–20g are alternately overlying, only one side of each pivot portion 21 defines a pivot face 24 which contacts the adjoining link members. Support portions 25, 26 oppositely extend from pivot portion 21 between pivot openings 22 to define bearing edges 27, 28 and straight outer edges 29. It is to be especially noted that support portions 25, 26 are of flat coplanar configurations in distinction to the folded hem of the prior art.

The pivot portion 21 and planar support portions 25, 26 are clearly defined in that the support portions 25, 26 are raised or off-set from the pivot portion 21, one-half the thickness of the link members 20a–g. This may be visualized best with reference to the enlarged cross-section of FIG. 9, which, stating in other words, shows that the pivot face 24 is depressed one-half the thickness of the link member 20a–g. The bearing edges 27 are parallel continuations of vertical diameters B—B through pivot openings 22. The straight outward edge 29, between the side support edges 27, encloses the rectangular configuration of support portion 25. The support edges 28 of the planar support portion 26 are convergent (as shown) to a straight intersecting outward edge 29a. This results in a trapezoidal configuration for planar support portion 26. An angle $\theta$ is defined between an extension of a diameter B—B and the support edges 28.

One of a plurality of identical guard members 20a–f is provided for each link member 20a–g, at the side of pivot portion 21 opposite pivot face 24. As shown in FIG. 6, the guard member 30a includes a reinforcement tie-bar portion 31 having pivot openings 32, all corresponding to the configuration of pivot portion 21 and pivot openings 22, respectively, of link member 20a–g. Guard portions 35, 36 extend oppositely from the reinforcement tie-bar portion 31, as shown. Unlike link members 20a–g, demarkation between portions 31, 35 and 36 is not definite, since they are in the same plane. The guard portions 35, 36 define diverging edges 37, 38 with intervening guard edges 39, 39'. Spaced openings 33 are provided along a vertical axis to also correspond with openings 23 of the link member 20a–g. Additional openings 34 are also provided on the vertical axis as shown. Some of the openings 34, it will be noted, have raised rims, as indicated in FIGS. 5 and 7, for a purpose to be set forth hereafter.

Since the link support portion 26 has converging edges 28 and is smaller than support portion 29, the corresponding guard portion 36 is likewise smaller than guard portion 35. Furthermore, guard portion 35 has one guard edge 39 which has curved end portions 45, as shown, at either end. The curved portions 45 correspond ot an arc four times $\theta$, or double the maximum gap G between adjacent bearing edges 27 in the articulated support 10.

It is noted that the outer section 40 of guard portions 35, 36 are depressed in order to bring guard edges 39, 39' into close proximity with the link member outward edges 29, as demonstrated in FIGS. 2, 4 and 5.

Pivot means are provided to joint link members 20a–g together, while at the same time coupling guard members 30a–f therewith; that is, the fasteners 50 pass through the pivot openings 22, 32 of each link and guard member, respectively. The fasteners 50 may be, as shown, a bolt 51 and a corresponding nut 52. Notice that bolt 51 includes an unthreaded shaft portion 53 is appropriately dimensioned, as to length and diameter, to closely fit into and extend through openings 22, 23. Washers 55 may be employed to spread the stress and absorb some of the wear thereat. It is understood that nut 52 may be of a self-locking type to prevent loosening thereof during operation of the articulated support 10. The nut 52 is, of course, sufficiently tightened on the threaded section 54 of bolt 51 to maintain pivot faces 24 of adjacent link members together, and yet allow a limited articulation.

Although not exclusively so, the articulated support 10 is usually of a pair of parallel and registeringly aligned chains 60, 62 of link members 20a–g, as illustrated in FIG. 5. The chains 60, 62 are joined by a support structure 65 indicated in phantom. The support structure 65 is fastened between selected pairs of individual link members 20a–g by suitable fasteners (not shown) passing through openings 23, 33 of the link and guard members 20a–g, 30a–f, respectively. Since the openings 23, 33 are along a vertical central axis of the link members 20a–g, the support structure 65 is disposed in a plane passing through that axis. The support structure 65 may include one or more openings 67 through which the various supply conduits (not shown) are passed for support thereon. In this manner, the supply conduits are supported throughout their entire length and are limited to a bend of a minimal radius determined by the articulation of support 10. The additional openings 34 having raised edges are disposed (see FIG. 5) in opposing pairs at the inside of chains 60, 61. An elongated roller member (not shown) may be journalled between the raised rims of openings 34 therein to provide support for long, flexible chip guards, such as those disclosed in my prior Pat. No. 3,330,105 issued July 11, 1967.

Operation of the flexible support 10 will be described in conjunction with FIGS. 1 through 4. The link members 20a, b, and c, are shown in fully articulated positions with the converging edges 28 in abutment. This, of course, produces a gap G between the bearing edges 27 (see FIG. 8). The remaining links 20d, e, and f, show an alternate extreme position with the bearing edges 27 in abutment. Then, as shown (FIG. 4), a gap G', appears between the edges 28. It is understood that each link member 20a–g will assume a continually changing disposition in transition between the two extremes shown. The engagement between abutting bearing edges 27 is sufficient to support the articulated support 10 and conduits (not shown) carried thereby in a straight horizontal disposition. Likewise, engagement between bearing edges 28 suffices to define a curve of a chosen minimum radius. The guard members 30a–g are on alternate sides of each chain 60, 61; that is, on the side of each link member 20a–g opposite its pivot face 24. The diverging guard portions 34, 35 overlap each adjoining link even at extreme dispositions. Thus both sides of each gap G–G' is protected, thereby insuring that accidental insertion therebetween is prevented. The curved edges 45 insure a smooth continuation of the outer edges 29 and 39 during the curved travel portion of the support member 10, as shown.

The present invention may be embodied in other forms of art departing from the spirit of potential attributes thereof described and, accordingly, reference should be made to the appended claims, rather than to the foregoing specification as indicating the scope of the invention.

I claim:

1. An articulated support for a flexible supply conduit to a movable terminal, comprising in combination: a plurality of alternately overlying link members, each including a central pivot portion with spaced pivot openings and planar support portions extending from opposite margins of said pivot portion to define bearing edges, one of said support portions having converging bearing edges, said pivot portion defining a pivot face at one side, said support portions being offset, with respect to said pivot face, from said pivot portion for abutment of adjacent of said bearing edges; pivot means through said pivot openings to join said link members consecutively while allowing limited pivoting therebetween confined in the direction of a plane through said pivot face and to an arc between adjacent of said bearing edges; a flat guard member fastened on the side of each link member opposite said pivot face, said guard member including a tie-bar portion of configuration corresponding to said pivot portion for reinforcement thereof and guard portions oppositely extending from said tie-bar portion over said support portions, said guard portions defining diverging edges outward of said bearing edges to overlap said adjacent of said support portions at both sides of said link members for prevention of any accidental intrusion therebetween; and support means on said link members for carrying said conduit.

2. An articulated support in accordance with claim 1, wherein said tie-bar portion configuration includes spaced pivot openings corresponding to those of said pivot portions, said guard member being fastened on to each link member by said pivot means passing therethrough.

3. An articulated support in accordance with claim 1, wherein the remaining one of said support portions defines a straight outer edge and parallel bearing edges which are extensions of diametric axes through said pivot openings, said guard member having a guard edge at said outer edge, said guard edge having curved ends corresponding to said arc to provide a smooth outer edge continuation between adjacent of said link members.

4. An articulated support in accordance with claim 3, wherein said guard portions include a depressed portion placing said guard edge proximate said outer edge.

5. An articulated support for a flexible supply conduit to a movable terminal, comprising in combination: a plurality of alternately overlying link members, each having a pivot face and bearing edges, at least part of said edges being raised from said pivot face for abutment of adjacent of said edges, each of said link members including converging bearing edges; pivot means joining said link members consecutively, pivot face to pivot face, respectively, to allow a limited pivoting therebetween confined in the direction of a plane through each pivot face and in an arc between adjacent of said bearing edges; a flat guard member fastened on the side of each link member opposite said pivot face, said guard member including a tie-bar portion for link reinforcement and guard portions oppositely extending from said tie-bar portion over said bearing edges, said guard portion defining diverging edges outward of said bearing edges to overlap adjacent of said link members at both sides thereof for prevention of any accidental intrusion therebetween.

6. An articulated support in accordance with claim 5, wherein said guard members are fastened on to said link members by said pivot means.

7. An articulated support in accordance with claim 6, wherein each link member includes straight outer edges and a set of parallel bearing edges, said guard member defining a guard edge over said outer edge, said guard edge having curved ends corresponding to said arc for a smooth continuation between adjacent of said outer edges.

References Cited

UNITED STATES PATENTS

| 2,975,807 | 3/1961 | Waninger | 248—49 |
| 3,053,358 | 9/1962 | Gross | 248—49 |
| 3,098,349 | 7/1963 | Waninger | 248—49 |
| 3,157,376 | 11/1964 | Merker | 248—49 |

FOREIGN PATENTS

| 800,468 | 12/1968 | Canada | 248—51 |

CHARLES W. LANHAM, Primary Examiner

G. P. CROSBY, Assistant Examiner

U.S. Cl. X.R.

248—49